June 5, 1951   P. P. STOCKINGER   2,555,770
MODULATOR
Filed March 13, 1948

INVENTOR
PAUL P. STOCKINGER
BY
Cecil J Arens
ATTORNEY

Patented June 5, 1951

2,555,770

UNITED STATES PATENT OFFICE 2,555,770

MODULATOR

Paul P. Stockinger, South Bend, Ind., assignor to Bendix Aviation Corporation, South Bend, Ind., a corporation of Delaware Application March 13, 1948, Serial No. 14,730

9 Claims. (Cl. 332—56)

This invention relates to modulators for electrical circuits.

An important object of the invention resides in the provision of a mechanism for changing the wave form of a continuous direct current. The construction of the mechanism is such that a varying magnetic flux intensity causes the contact pressure between a pair of contact elements to vary between predetermined minimum and maximum limits to thereby change the wave form of the current passing through the contacts.

Another object of the invention is to provide an adjustment for a modulator so that the desired wave form may be selected within a prescribed range.

Figure 1:
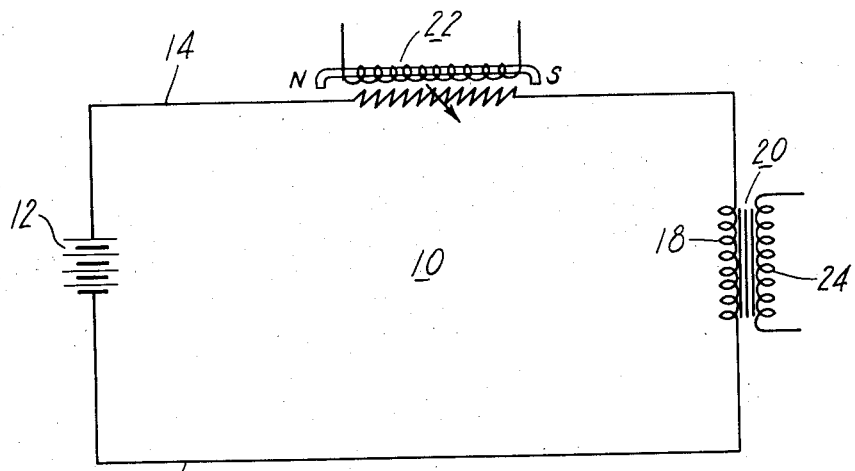
Figure 2:
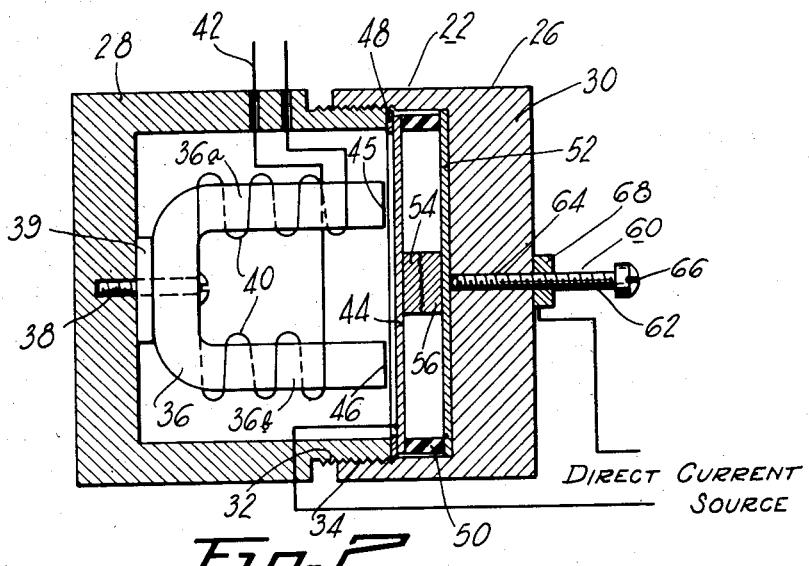

The above and other objects and features of the invention will be apparent from the following description of the apparatus taken in connection with the accompanying drawing which forms a part of this specification, and in which:

Figure 1 is a circuit drawing showing the location of the invention therein; and Figure 2 is a longitudinal sectional view of the device of the invention.

Referring to Figure 1 of the drawing reference numeral 10 designates a circuit in which a source, as for example a battery 12, supplies a continuous direct current to the lines 14 and 16, to which a primary winding 18, of transformer 20, is connected. A modulator 22 is connected in circuit 10 in series relationship to the battery and primary winding to change the continuous direct current from the battery to a non-continuous direct current. The passage of a fluctuating direct current through the primary winding 18 induces an alternating current in secondary winding 24 which in turn is connected to a load, not shown.

Figure 2 illustrates the modulator 22 of the invention in detail and comprises a housing 26 formed from two open-end cup-like members 28 and 30 made of a non-magnetic material, the former member of which is threaded exteriorly at 32 to engage interior threads 34 of the latter member to thereby hold the housing in assembled relationship. A permanent U-shaped magnet 36 is securely held in place in the cup-like member 28 by any suitable means, such as screw 38, which passes through the base of the magnet and threadedly engages the cup-like member. An insulating element 39 separates the permanent magnet from the housing. An exciting winding or coil 40 encircles the two legs or poles 36a and 36b of the permanent magnet. This winding is provided with a pair of lead wires 42 connectible to an alternating current source, not shown, for supplying an exciting current to the coil to thereby produce a magnetomotive force which is either added to or subtracted from the magnetomotive force of the permanent magnet. A vibratable member or diaphragm 44, made from magnetic material, is disposed adjacent pole faces 45 and 46 so that the magnetic field or flux emanating from the permanent magnet and coil links with the diaphragm. The flux from the permanent magnet alone, that is, without the flux from the coil, normally deflects the diaphragm a predetermined amount. An insulating washer 48 is interposed between the diaphragm 44 and cup-like member 28. An insulating ring 50 acts as a spacer for separating diaphragm 44 from a diaphragm 52, the latter of which is held in position between the spacing ring 50 and the cup-like member 30. A pair of conducting or contact elements 54 and 56 are securely fastened to diaphragms 44 and 52 respectively to provide a variable resistance means for circuit 10. These contact elements are arranged in series in circuit 10 so that when diaphragm 44 is vibrated the contact pressure of these contacts will be varied and hence the resistance of the circuit thereby changing the wave form of the current in the circuit from a steady or continuous direct current to a modulating or fluctuating current. These contact elements are made of carbon granules held in contact relationship by any suitable bonding means, such as cement, by way of example. With such an arrangement the resistance of these contacts varies inversely with the contact pressure.

An adjusting device 60 is mounted on the cup-like member 30 for varying the initial contact pressure between the two contacts. This adjusting device comprises an adjusting screw 62 threadedly engaging a threaded opening 64 of the cup-like member. The screw is provided with a screw driver slot 66 at one end, the other end of which abuts the diaphragm 52. A lock nut 68 holds the screw in any desired position after adjustment has been made.

Operation of the modulator is as follows:

The continuous direct current to be modulated, in the present embodiment the current from battery 12, is passed through lines 14 and 16. The winding 40 is connected to a source of alternating current, not shown, of any desired frequency for vibrating diaphragm 44. Vibrating this diaphragm will vary the contact pressure of the contacts 54 and 56 to thereby vary the resistance and consequently change the continuous direct current emanating from the battery to a fluctuating direct current which varies in amplitude with respect to time. This fluctuating direct current induces an alternating current in secondary winding 24. The arrangement of the permanent magnet and coil are such that the magnetic flux from the magnet normally deflects the diaphragm 44 a given amount. Energization of the winding 40, by sending an alternating current therethrough will increase or decrease the total magnetic flux intensity acting on the diaphragm depending upon the direction of current through the winding. During a laboratory test on the device shown in the drawing a 400 cycle alternating current of sine wave form was impressed on leads 42 to energize winding 40 and a current having a sine wave form was taken from the secondary 24 of transformer 20. The current in the secondary winding 24 has a frequency of 400 cycles and an amplitude proportional to the impressed voltage on lines 14 and 16. It will be noted that since the current wave produced in the secondary is entirely isolated from the 400 cycle alternating current circuit it will be possible to amplify minute D. C. voltages of the order of .0005 volt or less, for example.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. A modulator device comprising a permanent magnet, a coil connectible to an alternating current circuit and arranged with respect to said magnet to vary the magnetic flux thereof in accordance with the frequency of the current in the circuit, a diaphragm positioned to be linked by magnetic flux from said coil and magnet and deflected proportionately to the linking flux, and means connectible to a continuous direct current circuit and controlled by said diaphragm for changing the wave form of said continuous direct current.

2. A modulator device comprising a permanent magnet, a coil connectible to an alternating current circuit and arranged with respect to said magnet to vary the magnetic flux thereof in accordance with the frequency of the current in the coil, a vibratable member constructed and arranged to be vibrated by the resultant magnetic flux of the magnet and coil, and means connectible to a continuous direct current circuit and controlled by the vibratory action of said member for changing the wave form of said continuous direct current.

3. A modulator comprising a coil, a permanent magnet the magnetic flux intensity of which is varied by sending a fluctuating current through said coil, a diaphragm positioned adjacent said magnet to be vibrated by the variation in flux intensity acting on said diaphragm, a second diaphragm spaced apart from the first named diaphragm, and a conducting element carried by each diaphragm and connectible to a continuous direct current circuit, said conducting elements being constructed and arranged in contact relationship so that contact pressure between said elements varies between a predetermined minimum and maximum when said first named diaphragm is vibrated, whereby the wave form of said continuous direct current is changed.

4. A modulator comprising a coil, a permanent magnet the magnetic flux of which is varied by sending a fluctuating current through said coil, a diaphragm positioned adjacent said magnet to be vibrated by the variation in flux intensity acting on said diaphragm, a second diaphragm spaced apart from said first named diaphragm, and a carbon granule conducting element carried by each diaphragm and connectible to a continuous direct current circuit, said conducting elements being constructed and arranged in contact relationship so that contact pressure between said elements varies between a predetermined minimum and maximum when said first named diaphragm is vibrated, whereby the wave form of said continuous direct current is changed.

5. A modulator comprising a coil, a permanent magnet the magnetic flux intensity of which is varied by sending a fluctuating current through said coil, a vibratable member positioned adjacent said magnet to be vibrated by the variation in flux intensity acting on said member, and a pair of contact elements connectible to a continuous direct current circuit, one of said contact elements being carried by said member, said contact elements being constructed and arranged in contact relationship so that contact pressure between said elements varies between a predetermined minimum and maximum when said member is vibrated, whereby the wave form of said continuous direct current is changed.

6. A modulator comprising a coil, a permanent magnet the magnetic flux intensity of which is varied by sending a fluctuating current through said coil, a vibratable member positioned adjacent said magnet to be vibrated by the variation in flux intensity acting on said member, a pair of contact elements connectible to a continuous direct current circuit, one of said contact elements being carried by said member, said contact elements being constructed and arranged in contact relationship so that contact pressure between said elements varies between a predetermined minimum and maximum when said member is vibrated, whereby the wave form of said continuous direct current is changed, and an adjustment for varying the minimum contact pressure of said contact elements.

7. A device for changing the wave form of a current comprising a magnet from which emanates magnetic flux having a prescribed direction and intensity, a coil connectable to an alternating current circuit and wound on said magnet to modify the flux therefrom in accordance with the frequency of the current in the circuit, a vibratable member positioned in the flux field of said magnet and coil, and means connectable to a direct current circuit and controlled by said vibratable member for changing the wave form of said direct current.

8. A device for changing the wave form of a current comprising a magnet constructed and arranged to emit magnetic flux having a prescribed direction and intensity, a coil inductively related to said magnet and connectable to an alternating current circuit for modifying the flux from said magnet in accordance with the frequency of the alternating current, a vibratable member located in the flux field of said magnet and coil, and means connectable to a direct current circuit and controlled by said vibratable member for changing the wave form of said direct current.

9. A modulator device comprising a permanent magnet, a coil connectible to an alternating current circuit and arranged with respect to said magnet to vary the magnetic flux thereof in accordance with the frequency of the current in the circuit, a vibratable member positioned to be linked by magnetic flux from said coil and magnet and deflected proportionately to the linking flux, and means connectible to a continuous direct current circuit and controlled by said vibratable member for establishing a current having a wave form substantially the same as that of the alternating current in said coil.

PAUL P. STOCKINGER.

REFERENCES CITED

The following references are of record in the file of this patent:

UNITED STATES PATENTS

| Number | Name | Date |
|---|---|---|
| 1,677,190 | Loynes | July 17, 1928 |
| 1,945,690 | Hund | Feb. 6, 1934 |
| 1,962,154 | Pierce | June 12, 1934 |
| 2,015,189 | Osnos | Sept. 24, 1935 |
| 2,347,098 | Green | Apr. 18, 1944 |
| 2,347,200 | Lehde | Apr. 25, 1944 |